United States Patent [19]

Neugebauer

[11] Patent Number: 4,592,456
[45] Date of Patent: Jun. 3, 1986

[54] VISCOUS COUPLING FOR A COOLING AIR FAN

[75] Inventor: Dieter Neugebauer, Sennfeld, Fed. Rep. of Germany

[73] Assignee: Fichtel & Sachs AG, Schweinfurt, Fed. Rep. of Germany

[21] Appl. No.: 638,741

[22] Filed: Aug. 8, 1984

[30] Foreign Application Priority Data

Aug. 9, 1983 [DE] Fed. Rep. of Germany ....... 3328646

[51] Int. Cl.$^4$ ............................................. F16D 35/00
[52] U.S. Cl. .................. 192/58 B; 192/82 T
[58] Field of Search ............................ 192/58 B, 82 T

[56] References Cited

U.S. PATENT DOCUMENTS

| 4,086,988 | 5/1978 | Spence | 192/58 B |
| 4,086,989 | 5/1978 | Spence | 192/58 B |
| 4,441,599 | 4/1984 | Storz | 192/58 B |

FOREIGN PATENT DOCUMENTS 2750289 5/1978 Fed. Rep. of Germany .
1556081 11/1979 United Kingdom .

*Primary Examiner*—Allan D. Herrmann
*Attorney, Agent, or Firm*—Toren, McGeady, Stanger, Goldberg & Kiel

[57] ABSTRACT

The viscous coupling for a cooling air fan, especially of an internal combustion engine, comprises a drive shaft rotatable about a rotation axis, on which a housing is rotatably mounted. A partition divides the housing into a reservoir for a viscous shear fluid and a working chamber. In the working chamber there is arranged a rotor non-rotatably held on the drive shaft. The rotor together with the housing or its partition defines at least one shear gap. A controllable valve device connecting the reservoir with the working chamber controls the inflow of the shear fluid from the reservoir into the working chamber, especially in dependence upon temperature. Adjoining the partition the working chamber possesses in the region of the external circumference of the rotor an annular space formed at least partly by the rotor. The partition contains at least one over-flow opening for the shear fluid, opening into the annular space. On the housing or its partition there is mounted a baffle flap mounted for pivoting about a flap axis. The baffle flap forms a pump element effective in both directions of rotation of the rotor. The arms of the baffle flap alternately baffle the shear fluid in the annular space for pumping away and alternately close the over-flow openings. The flap axis can extend either radially or parallel with the rotation axis of the rotor. The baffle flap is preferably made symmetrical in relation to a plane including the flap axis.

15 Claims, 10 Drawing Figures

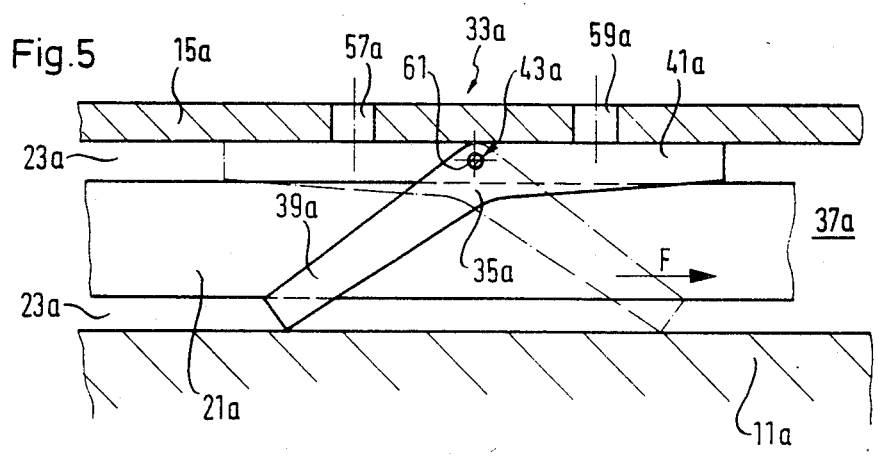
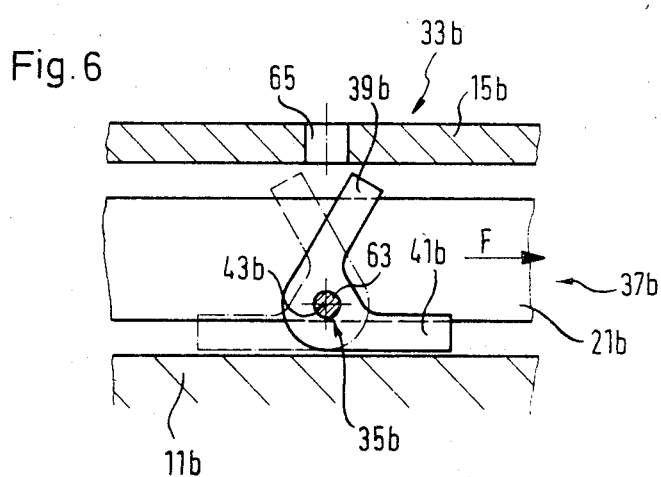
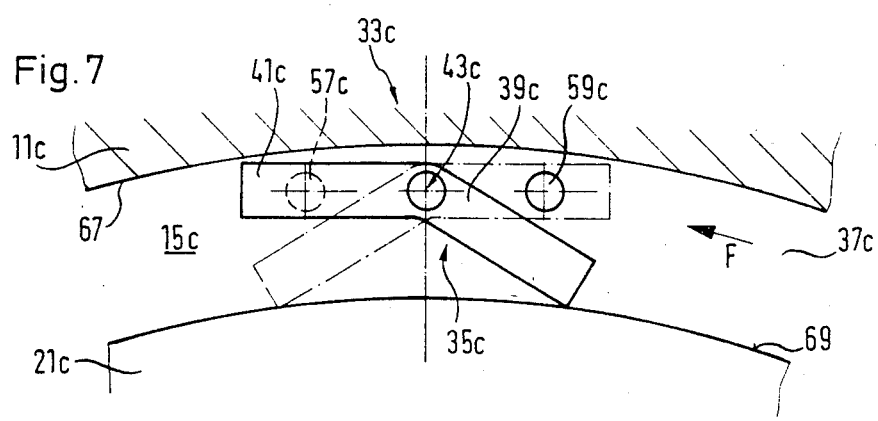

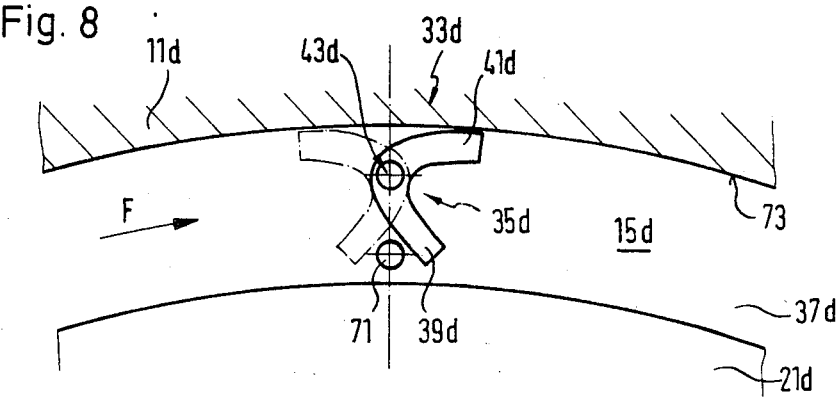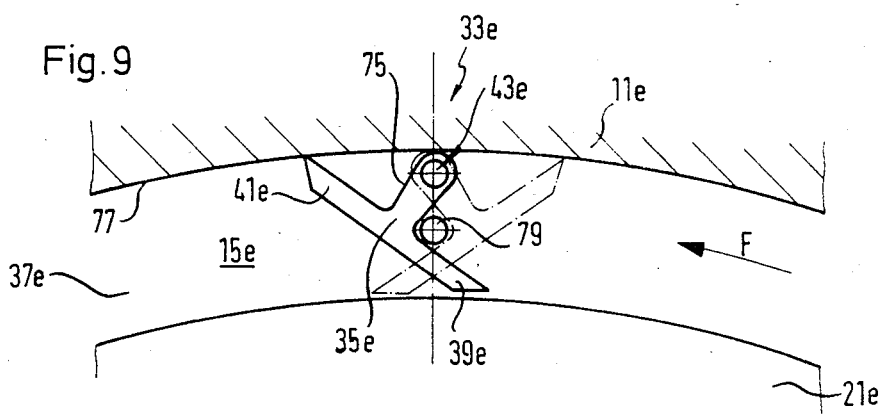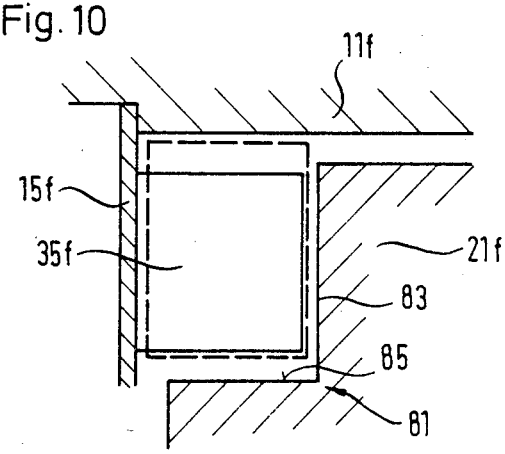

VISCOUS COUPLING FOR A COOLING AIR FAN

BACKGROUND OF THE INVENTION

The invention relates to a viscous coupling for a cooling air fan, especially for the internal combustion engine of a motor vehicle.

From German Publication Specification No. 27 50 289 a viscous coupling for a cooling air fan of a motor vehicle internal combustion engine is known in which a housing carrying the fan blades is rotatably mounted on a drive-input shaft driven about a rotation axis by the internal combustion engine. The housing contains a partition which divides it in the axial direction into a reservoir for a viscous shear fluid and a working chamber. In the working chamber there is arranged a rotor non-rotatably held on the drive-input shaft. The rotor together with the housing or its partition defines at least one shear gap. A temperature-dependently controllable valve device connecting the reservoir with the working chamber controls the flow of the shear fluid from the reservoir into the working chamber. On the working chamber side the partition is adjoined in the region of the external circumference of the rotor by an annular space defined at least partially by the rotor. The partition contains at least one over-flow opening connecting this annular space with the reservoir. A cylindrical roll is guided on the housing for movement in the circumferential direction of the annular space between two stops in relation to the over-flow opening. The roll forms a pump element which on rotation of the rotor pumps the shear fluid back from the working chamber into the reservoir, by reason of the slip. The roll changes its end position in dependence upon the direction of rotation of the rotor. Thus the viscous coupling can be operated in both directions of rotation of the rotor and universally used.

In the known viscous coupling the flow-favoring cylinder form of the pump element has a disadvantageous effect upon the pump action. Furthermore, to accommodate the pump element two noses arranged with spacing in the circumferential direction are provided on the inner jacket of the housing, which form a pocket between them for the accommodation of the pump element and reach to close to the external circumference of the rotor. The noses baffle the shear fluid without increasing the pump effect. Finally, in the acceleration and retardation of the rotor, the inertia forces of the pump element take effect and prevent the flow of shear fluid from being as uniform as possible in all operational conditions.

OBJECT OF THE INVENTION

It is an object of the invention, in a viscous coupling drivable in both directions of rotation, especially for a cooling air fan of a motor vehicle, to improve the pump effect of the rotation-direction-independent pump system, namely with low production expense.

SUMMARY OF THE INVENTION

Within the scope of the invention the pump element is formed as a baffle flap mounted on the housing or its partition for hinging about a flap axis extending transversely of the circumferential direction of the annular space. The flap pivots in dependence upon the direction of rotation of the rotor into one of its two end positions and thus liberates the over-flow opening according to the direction of rotation. The cross-section of the annular space can be exploited almost completely for the baffle action of the baffle flap.

In a preferred form of embodiment the flap axis is arranged in the region of one of two defining wall surfaces which define the annular space in the circumferential direction on opposite sides. The baffle flap has two baffle arms, substantially symmetrical in relation to a plane enclosing the flap axis, which in the end positions abut alternately on the defining wall adjacent to the flap axis. The other baffle arm in each case protrudes towards the opposite defining wall into the annular space and preferably reaches to close to this opposite defining wall. The influence of the inertia force upon the pump element can be greatly reduced in this way. Furthermore, the pump characteristics are improved. The flap axis can extend either radially or parallel with the rotation axis of the rotor.

The angle between the baffle arms is expediently less than 180°. If the angle is greater than 90°, preferably two over-flow openings arranged in the circumferential direction of the annular space on both sides of the flap axis are provided which are closed by the baffle arms alternately according to the direction of rotation of the rotor. In the case of an angle of less than 90° between the two baffle arms, a single over-flow opening suffices provided that it lies in a plane which also includes the flap axis and the axis of rotation of the rotor. The flap axis can be arranged in the region of intersection of the baffle arms. In the case for example of T-shaped baffle flaps the flap axis can also extend at a distance from the baffle arms.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIGS. 5 to 9 show variants of pump elements which are usable in place of the pump element according to FIGS. 2 to 4 in a coupling according to FIG. 1, and FIG. 10 shows a sectional view of a variant, usable in the coupling according to FIG. 1, of the annular space accommodating the pump element.

DETAIL DESCRIPTION OF THE DRAWINGS

Figure 1:
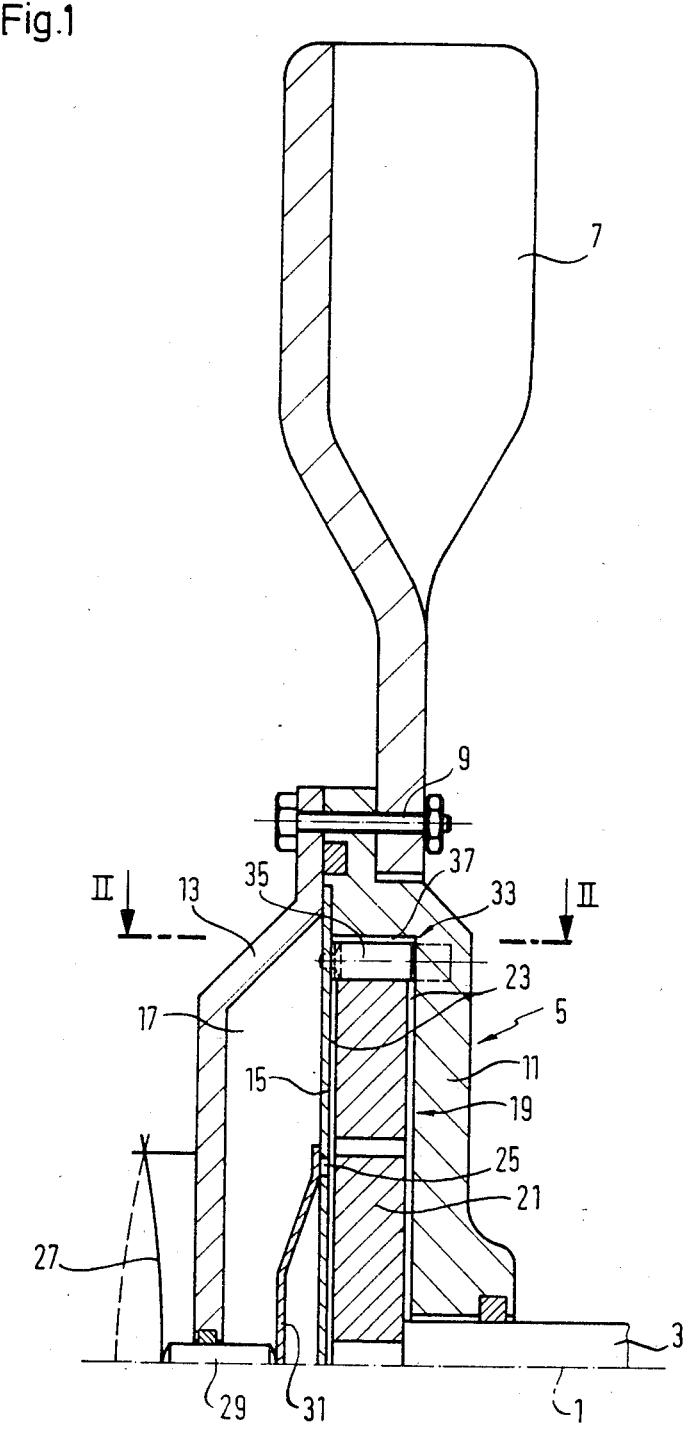
FIG. 1 shows an axially extending section through a viscous coupling of a cooling air fan of a motor vehicle internal combustion engine.

The viscous coupling as illustrated in FIG. 1 comprises a drive shaft 3 drivable about a rotation axis 1 of an internal combustion engine (not shown) of a motor vehicle. On the drive shaft 3 a housing 5 sealed to the exterior is mounted rotatably but axially fixedly. Several fan blades 7 are secured removably with screws 9 on the housing 5 in distribution in the circumferential direction. The housing 5 comprises a housing part 11 of pot form mounted in sealed manner on the drive shaft 3, which part is closed on the side axially remote from the drive shaft 3 by a cover 13. A partition 15 between the housing part 11 and the cover 13 divides the interior of the housing 5 into a reservoir 17 for shear fluid and a working chamber 19. In the working chamber 19 of the housing 5 a rotor 21 of disc form is arranged which together with the wall surfaces of the housing part 11 opposite to it and with the partition 15 forms shear gaps 23. The rotor 21 is seated fixedly on the drive-output shaft 3 and can rotate together therewith in relation to the housing 5.

The partition 15 has a passage opening 25 through which the shear fluid (not illustrated further) of the reservoir 17 can pass into the working chamber 19 even when the drive shaft 3 is stationary. A temperature sensor 27, for example a bimetallic element outside the housing 5, responding to the temperature of the radiator or of the internal combustion engine, through a pin 29 displaceable axially in the cover 13 controls a valve lever 31 which closes the opening 25 at low working temperature and opens it at high working temperature. In the region of the external circumference of the rotor 21 there is provided a pump device 33, explained in greater detail hereinafter, which works independently of the direction of rotation of the drive shaft 3 and on relative rotation of the rotor 21 and the housing 5 pumps the shear fluid from the working chamber 19 through the partition 15 back into the reservoir 17. The pump device 33 has a pump element 35 which protrudes into an annular space 37 surrounding the rotor 21. The annular space 37 is enclosed by the external circumference of the rotor 21, the partition and the housing part 11.

The coupling transmits a torque from the drive shaft 3 to the housing 5 when the shear gaps 23 are filled with shear fluid. By reason of the slip between the housing 5 and the rotor 21 the pump element 35, of which several may be present, moves in the circumferential direction through the annular space 37 and pumps the shear fluid, forced outwards by centrifugal force, continuously out of the annular space 37 and into the reservoir 17.

In the case of high working temperature the valve lever 31 opens the inflow opening 25 and the shear fluid can flow continuously back out of the reservoir 17 into the working chamber 19 so that the shear gaps 23 remain filled and the fan blades 7 are driven. At low working temperature the valve lever 31 closes the inflow opening 25. Thus the shear gaps 23 are pumped empty and the fan coupling is disengaged.

Figure 2:
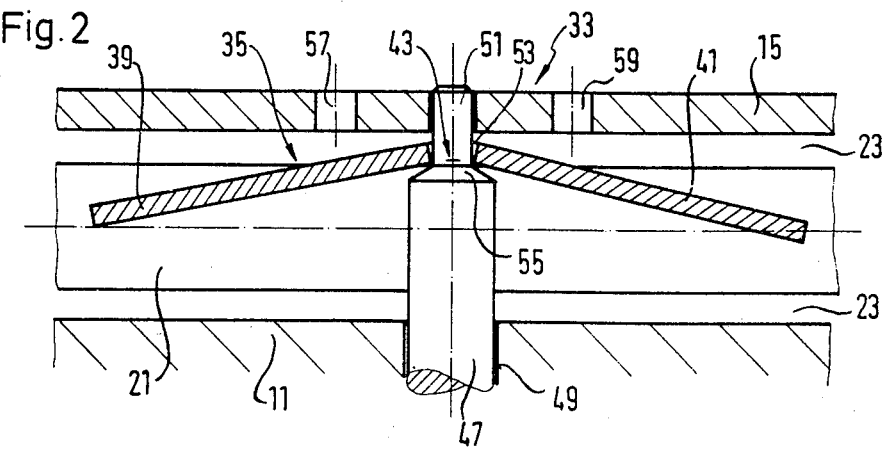
FIGS. 2 and 3 show sectional views through the region of a baffle flap, serving as pump element, of the coupling, seen along a line II—II in FIG. 1, in different operational conditions.
Figure 3:
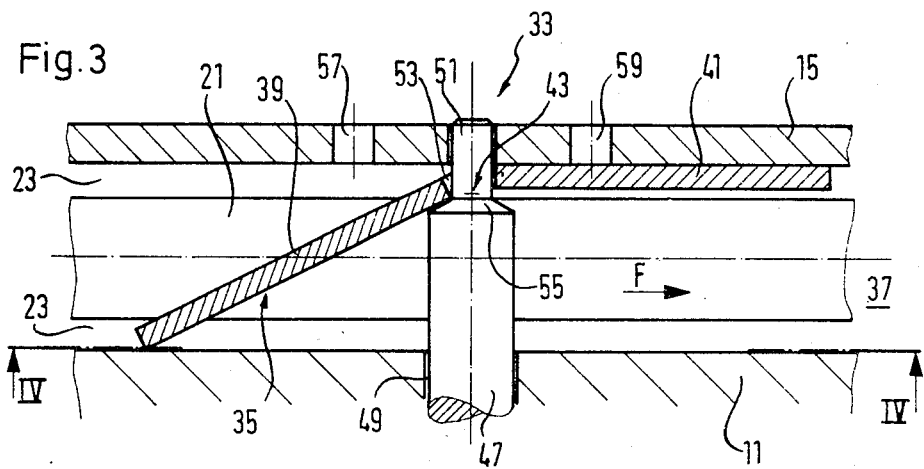
Figure 4:
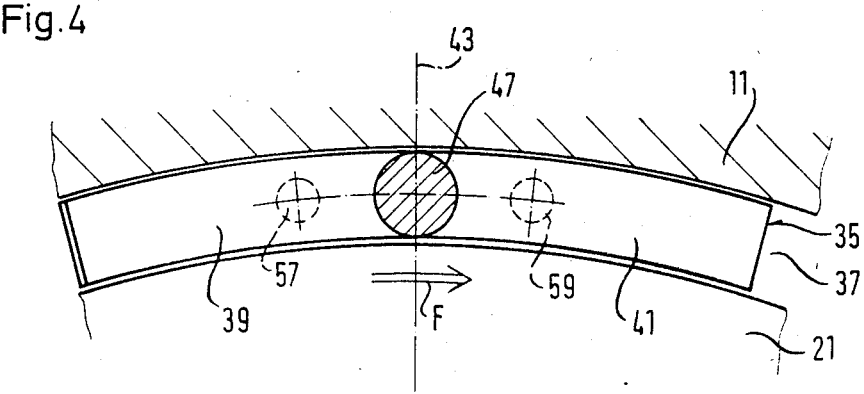
FIG. 4 shows a sectional view of the coupling, seen along a line IV—IV in FIG. 3.

FIGS. 2 to 4 show details of the pump device 33 which is equally effective in both directions of rotation of the rotor 21. The pump element 35 has the form of an equalarmed baffle flap the flat, strip-form baffle arms 39, 41 of which protrude at an angle of more than 90° but less than 180° to one another in the circumferential direction of the annular space 37 away from a flap axis 43 extending radially of the rotation axis 1. The side faces of the baffle arms 39, 41 proceed substantially radially of the rotation axis 1. The baffle flap 35 is retained pivotably about the flap axis 43 adjacently to the partition 15 on a pin 47 extending parallel with the rotation axis 1. The pin 47 is seated in an opening 49 of the housing part 11 and engages with a journal 51 of smaller diameter through an opening 53 in the transition region of the two baffle arms 39, 41 into the partition 15. An annular shoulder 55 fixes the baffle flap 35 in the axial direction between itself and the partition 15. The pump device 33 comprises two over-flow openings 57 and 59 arranged in the circumferential direction of the annular space 37 on both sides of the flap axis 43 in the partition 15. The over-flow openings 57, 59 are arranged together with the journal 51 on the same circumferential circle of the annular space 37. The baffle arms 39, 41 can apply themselves alternately against the partition 15 and in doing so close the over-flow opening 57 and 59 respectively adjacent to them in each case. The baffle arms 39, 41 are dimensioned as regards their length and intermediate angle so that the baffle arm which is in each case not applied to the partition 15 reaches close to the defining wall of the housing part 11 lying opposite in the direction of the rotation axis 1, and may come into contact with the defining wall, as represented in FIG. 3. As FIG. 4 shows, the baffle arms 39, 41 are curved in conformity with the circumferential curvature of the annular space 37 so that the baffle arm reaching from the flap axis 43 to the defining wall of the housing part 11 substantially completely blocks the cross-section of the annular space 37.

FIG. 2 shows the baffle flap 35 with the coupling stationary in a middle position. In FIG. 3 the rotor 21 is being driven in the direction of an arrow F. By reason of the slip between the housing 5 and the rotor 21 the shear fluid flows likewise in the direction of the arrow F in the annular space in relation to the housing 5. The shear fluid pivots the baffle arm 39 into the position as illustrated in which the baffle arm 41 rests on the partition 15 and closes the over-flow opening 59. The baffle arm 39 baffles the shear fluid which flows away through the over-flow opening 57 into the reservoir 17. In the case of the opposite direction of rotation of the rotor 21 the baffle arm 39 applies itself to the partition 15 and closes the over-flow opening 57, while the baffle arm 41 protrudes into the annular space 37 so that the shear fluid can flow away through the over-flow opening 59.

FIG. 5 shows another embodiment of a pump device 33a which differs from the pump device 33 in FIGS. 2 to 4 solely in the configuration of the flap axis and is usable in a coupling according to FIG. 1. Parts of like action are designated in FIG. 5 with the reference numerals of FIGS. 2 to 4 with the addition however of the letter a. To explain the function and manner of operation, reference is made to the description of FIGS. 1 to 4.

In detail, the baffle flap 35a is mounted on the housing part 11a to hinge about a flap axis 43a extending radially of the rotation axis of the rotor 21a. The flap axis 43a is formed by a pin 61 protruding radially inwards from the internal shell of the housing part 11a. The baffle flap 35a again comprises two baffle arms 39a and 41a extending at an angle to one another about the pivot axis 43a, at an angle between 90° and 180° and apply themselves alternately to the partition 15a and in doing so alternately close over-flow openings 57a and 59a in the circumferential direction on both sides of the flap axis 43a in the partition 15a. The baffle arm not applied in each case to the partition 15a reaches to the defining wall of the housing part 11a opposite to the partition 15a. In this way the coupling can be operated in both directions of rotation.

FIG. 6 shows a further variant of a pump device 33b usable in the coupling according to FIG. 1. Here as below the reference numerals of FIGS. 1 to 4 with the addition of the letter b are used for the explanation of parts of like effect.

The pump device 33b comprises a baffle flap 35b which is mounted for hinging likewise about a flap axis 43b, extending radially of the rotation axis of the rotor 21b, in the form of a pin 63 protruding radially inwards from the inner shell of the housing part 11b. In contrast to the baffle flaps of FIGS. 2 to 5, the flap axis 43b is arranged adjacent to the defining wall formed by the housing part 11b and lying at a distance opposite to the partition 15b. The partition 15b contains a single overflow opening 65 which connects the annular space 37b with the reservoir for the shear fluid. The overflow opening 65 lies substantially in a plane containing the flap axis 43b and the rotation axis of the rotor 21b.

The baffle flap 35b has two baffle arms 39b and 41b, which however in departure from the baffle arms of FIGS. 2 to 5 include between them only an angle of less than 90°. The baffle arms are symmetrical in relation to a plane including the flap axis 43b. They place themselves alternately against the wall surface of the housing part 11b defining the annular space 37b. The non-abutting baffle arm in each case extends to the edge of the over-flow opening 65 lying foremost in the direction of rotation of the rotor circumference and baffles the shear fluid of the annular space 37b so that this fluid can flow away through the over-flow opening 65. The length of the baffle arms 39b is dimensioned so that they can move past the over-flow opening 65 in the case of a change of the direction of rotation.

By reason of the symmetrical configuration of the baffle flaps of FIGS. 2 to 6 and the radial arrangement of the flap axis, centrifugal forces have no influence upon the function of the pump element.

FIGS. 7 to 9 show pump devices the baffle flaps of which in difference from FIGS. 2 to 6 are pivotable about flap axes which extend parallel with the rotation axis of the rotor. The baffle flaps are again made symmetrical in relation to a plane including the flap axis and pivot between two end positions in dependence upon the direction of rotation of the rotor. The pump devices can all be used in the coupling according to FIG. 1. Parts of like action are designated by reference numerals of FIGS. 1 to 4 and provided with additional letters for distinction. For more detailed explanation of the function and manner of operation, reference is made to the description of FIGS. 1 to 4.

FIG. 7 shows a pump device 33c with a baffle flap 35c which is mounted pivotably on a flap axis 43c extending coaxially with the rotation axis of the rotor 21c. The flap axis 43c is arranged in the region of the internal shell surface 67, radially outwardly defining the annular space 37c, of the housing part 11c. The baffle flap 35c has two baffle arms 39c and 41c inclined towards the rotor 21c at an angle greater than 90° but less than 180° to one another, which can apply themselves alternately against the inner shell 67, while the non-abutting baffle arm in each case protrudes towards the outer circumference 69c of the rotor 21c and preferably rests on the circumference 69 or terminates close before it. Two over-flow openings 57c and 59c are provided in the partition 15c on both sides of the flap axis 43c, preferably on a common circle about the rotation axis of the rotor 21c. The over-flow openings 57c and 59c are closed alternately by the baffle arm of the baffle flap 35c abutting in each case on the inner shell 67. The baffle arm protruding towards the circumference 69 of the rotor 21c baffles the shear fluid flow in the annular space 37c so that the shear fluid can flow away through the over-flow opening which is opened in each case.

The baffle flap 35c can be produced from a relatively soft material. For satisfactory sealing against the circumference 69 of the rotor 21c, the length of the baffle arms 39c and 41c can be dimensioned so that they initially rest on the rotor 21c and in the course of operation they wear down to a contact-free but satisfactory sealing dimension.

FIG. 8 shows a pump device 33d the baffle flap 35d of which similarly to the baffle flap in FIG. 6 comprises two baffle arms 39d and 41d arranged at an angle of less than 90° to one another. In accordance with FIG. 6 here again a single over-flow opening 71 in the partition 15d defining the annular space 37d is sufficient. The flap axis 43d of the baffle flap 35d, symmetrical in relation to a plane including the flap axis 43d, lies adjacent to the inner peripheral surface 73 of the housing part 11d. The over-flow opening 71 lies in a plane including the flap axis 43d and the rotation axis of the rotor 21d.

In the pump devices as explained above the flap axis lies substantially in the plane of intersection of the baffle arms.

FIG. 9 shows a pump device 33e the baffle flap 35e of which, seen in the direction of its flap axis 43e, has a substantially T-shaped cross-sectional form. The baffle arms 39e and 41e are formed by the transverse arms of the T-shaped cross-section and protrude from a base arm 75 the free end of which is held on the housing for pivoting about the flap axis 43e in the region of the inner shell 77 of the housing part 11e defining the annular space 37e. In the partition 15e there is again provided a single overflow opening 79 allocated to the baffle flap 35e, which opening lies in a plane including the flap axis 43e and the rotation axis of the rotor 21d. The position of the overflow opening 79 within the cross-sectional plane of the annular space 37e is variable within wide limits so that this form of embodiment of the pump device can be used without major conversion work even for already existing forms of embodiment of couplings.

In the pump device as explained above the annular space extends over the entire axial width of the rotor. This naturally increases the external diameter of the coupling. The external diameter can be reduced if in accordance with FIG. 10 the rotor 21f contains in its radially outer region an annular step 81 in which there engages the pump element 35f retained on the housing part 11f or partition 15f and formed as baffle flap. In place of the annular shoulder 81 it is also possible for an annular groove, open axially to the partition 15f, to be provided in the rotor 21f. The baffle flaps can abut closely on the axial faces 83 and/or radial faces 85 or extend at a slight distance. The baffle flap 35f can be formed in accordance with one of the baffle flaps as explained above.

While specific embodiments of the invention have been shown and described in detail to illustrate the application of the inventive principles, it will be understood that the invention may be embodied otherwise without departing from such principles.

We claim:

1. In a viscous coupling for a cooling air fan, comprising:
    (a) a drive shaft rotatable about a rotation axis,
    (b) a housing rotatable in relation to the drive shaft, having a partition which divides it into a reservoir for a viscous shear fluid and a working chamber,
    (c) a rotor non-rotatably retained on the drive shaft and arranged in the working chamber, which rotor together with the housing and its partition defines at least one shear gap, (d) a controllable valve device connecting the reservoir with the working chamber, (e) an annular space, adjoining the partition on the side of the working chamber and being at least partially defined by the rotor, in the region of the external circumference of the rotor, (f) at least one over-flow opening in the partition, connecting the annular space with the reservoir for flowing shear fluid therebetween, (g) at least one pump element protruding into the annular space and guided between two end positions in relation to the over-flow opening, said pump element being formed as a baffle flap mounted to be freely pivotable between the end positions about a flap axis extending transversely of the circumferential direction of the annular space, and said baffle flap can be displaced into the two end positions by the shear fluid in dependence on the direction of flow of the shear fluid in the annular space.

2. Viscous coupling according to claim 1, wherein the flap axis is arranged in the region of one of two defining walls defining the annular space on opposite sides in the circumferential direction, and wherein the baffle flap comprises two baffle arms substantially symmetrical in relation to a plane including the flap axis, which arms in their end position alternately abut on one of said two defining walls adjacent to the flap axis, while the other baffle arm protrudes towards the opposite defining wall into the annular space.

3. Viscous coupling according to claim 2, wherein the angle between the baffle arms is less than 180° and wherein the baffle arms abut alternately on the housing or its partition, thereby extending substantially in the circumferential direction of the annular space.

4. Viscous coupling according to claim 3, wherein an over-flow opening is provided in the partition on each of the two sides of the flap axis in the circumferential direction of the annular space, wherein the angle between the baffle arms is greater than 90° and the baffle arms protrude from opposite sides, in the circumferential direction of the annular space, of the flap axis, and wherein the baffle arm abutting on the housing or its partition closes the over-flow opening placed on its side, while the other baffle arm clears the over-flow opening allocated to it.

5. Viscous coupling according to claim 3, wherein the axis of the over-flow opening is placed substantially in a plane including the flap axis and the axis of rotation of the rotor and wherein the angle between the baffle arms is less than 90°.

6. Viscous coupling according to claim 2, wherein the baffle arm protruding into the annular space in the end position reaches substantially to said defining wall lying opposite and remote from the flap axis.

7. Viscous coupling according to claim 2, wherein the axis of the over-flow opening is placed substantially in a plane including the flap axis and the roration axis of the rotor, wherein the baffle flap has substantially a T-shaped cross-sectional form transversely of the flap axis and wherein the baffle arms are formed by two transverse arms protruding to opposite sides from a base arm and the flap axis is arranged at a distance from the transverse arms on the base arms.

8. Viscous coupling according to claim 7, wherein the distance of the flap axis from the over-flow opening is approximately equal to the length of the base arm.

9. Viscous coupling according to claim 7, wherein the length of the transverse arms is dimensioned so that the transverse arms in the end positions extend substantially from the defining wall of the annular space adjacent to the flap axis to the defining wall lying remotely opposite to the flap axis.

10. Viscous coupling according to claim 1, wherein the flap axis extends radially of the rotation axis of the rotor.

11. Viscous coupling according to claim 10, wherein the baffle flap is formed as a strip having sheet form, which strip is elongated in the circumferential direction of the annular space and extends with its flat side substantially radially of the rotation axis of the rotor and is angled about a radial angle line and in the region of its angle line has an opening and wherein a pin extending parallel with the rotation axis of the rotor penetrates the opening and with a shoulder pointing to the partition holds the strip for hinging between the shoulder and the partition.

12. Viscous coupling according to claim 11, wherein the strip is curved in its longitudinal direction in conformity with the radius of the annular space.

13. Viscous coupling according to claim 1, wherein the flap axis extends parallel with the rotation axis of the rotor.

14. Viscous coupling according to claim 13, wherein the flap axis is arranged adjacent to a circumferential wall of the housing which radially outwardly limits the annular space.

15. Viscous coupling according to claim 1, wherein the annular space extends over the entire axial width of the external circumference of the rotor.

* * * * *